United States Patent
Yamoto et al.

(10) Patent No.: US 9,231,499 B2
(45) Date of Patent: Jan. 5, 2016

(54) CONTROL DEVICE FOR INTERNAL COMBUSTION ENGINE

(71) Applicant: SUZUKI MOTOR CORPORATION, Hamamatsu-shi, Shizuoka (JP)

(72) Inventors: Norihiro Yamoto, Hamamatsu (JP); Tomonori Yasuda, Hamamatsu (JP); Katsunori Motoyama, Hamamatsu (JP)

(73) Assignee: SUZUKI MOTOR CORPORATION, Hamamatsu-Shi, Shizuoka (JP)

( * ) Notice: Subject to any disclaimer, the term of this patent is extended or adjusted under 35 U.S.C. 154(b) by 0 days.

(21) Appl. No.: 14/253,381

(22) Filed: Apr. 15, 2014

(65) Prior Publication Data

US 2014/0312626 A1    Oct. 23, 2014

(30) Foreign Application Priority Data

Apr. 19, 2013 (JP) ................. 2013-088027

(51) Int. Cl.
  *H02P 9/04* (2006.01)
  *H02P 3/06* (2006.01)
  *F02D 17/04* (2006.01)
  *H02J 7/14* (2006.01)
  *H02J 7/00* (2006.01)

(52) U.S. Cl.
  CPC *H02P 3/06* (2013.01); *F02D 17/04* (2013.01); *H02J 7/1461* (2013.01); *H02J 7/1469* (2013.01); *H02J 2007/004* (2013.01)

(58) Field of Classification Search
  CPC .................... F02D 17/04; H02P 3/06
  USPC ........... 290/40 R, 40 C; 180/65.29; 320/137, 320/136; 701/112
  See application file for complete search history.

(56) References Cited

U.S. PATENT DOCUMENTS

| 5,426,589 | A | * | 6/1995 | Kitagawa et al. | 700/274 |
| 7,525,287 | B2 | * | 4/2009 | Miyashita et al. | 320/134 |
| 9,030,165 | B2 | * | 5/2015 | Kawai et al. | 320/109 |
| 2013/0085657 | A1 | * | 4/2013 | Bito | 701/112 |
| 2013/0249488 | A1 | * | 9/2013 | Ju et al. | 320/112 |

FOREIGN PATENT DOCUMENTS

| JP | 2001-173480 A | 6/2001 | |
| JP | 2001173480 A | * 6/2001 | F02D 29/02 |

* cited by examiner

Primary Examiner — Julio C. Gonzalez Ramirez
(74) Attorney, Agent, or Firm — Stein IP LLC

(57) ABSTRACT

There is provided a control device for an internal combustion engine. An electricity generator is configured to be driven by the internal combustion engine. A battery is configured to store electricity generated by the electricity generator. A discharge amount detection section is configured to detect a discharge amount of the battery. An automatic stop control section is configured to automatically stop the internal combustion engine when the discharge amount is a first setting value or less. A continuous discharge amount detection section is configured to detect a continuous discharge amount of the battery based on the discharge amount. An automatic stop prohibition section is configured to prohibit an automatic stop when the continuous discharge amount is a second setting value or more, which is lower than the first setting value.

2 Claims, 3 Drawing Sheets

CONTROL DEVICE FOR INTERNAL COMBUSTION ENGINE

The disclosure of Japanese Patent Application No. 2013-088027 filed on Apr. 19, 2013, including specification, drawings and claims is incorporated herein by reference in its entirety.

TECHNICAL FIELD

The present invention relates to a control device for an internal combustion engine, and, more specifically, to a control device for an internal combustion engine which can recover a residual amount of a battery when the residual amount of the battery is insufficient due to an automatic stop of the internal combustion engine or the like.

BACKGROUND

In an internal combustion engine, a power generation device drives an electricity generator by use of a drive force of the internal combustion engine, and stores the electricity generated by the electricity generator in a battery. In the internal combustion engine, a control device automatically stops the internal combustion engine when an automatic stop condition such as stop of a vehicle is established, and automatically starts the internal combustion engine when an automatic start condition is established during the automatic stop of the internal combustion engine, so as to improve fuel efficiency.

With the control device for the internal combustion engine according to the related art, when the automatic stop condition is established in a state where a residual amount of the battery is low, the electric generation can be stopped by the automatic stop of the internal combustion engine. In this instance, since only discharge is performed by the battery, the residual amount of the battery becomes insufficient. In such a way, if the insufficient state of the residual amount of the battery is continued, a lifetime of the battery may be decreased (deteriorated).

In order to solve the above problem, Patent Document 1 discloses a control device for an internal combustion engine including a current consumption detecting means for detecting a current consumed by electric loads, and when a current consumption integrating value detected by the current consumption detecting means exceeds a setting value, the automatic stop of the internal combustion engine is prohibited. According to the control device of Patent Document 1, in the case where the current consumed from the battery is high, the automatic stop of the internal combustion engine is prohibited and the electricity generator is driven by the internal combustion engine. Thus, it is possible to prevent the residual amount of the battery from becoming excessively lacking.

Patent Document 1: Japanese Patent Application Publication No. 2001-173480A

However, if the battery is discharged continuously in a short time, the battery has a property that deterioration may be facilitated at an earlier stage. Accordingly, the deterioration in the battery may not be prevented only by prohibiting the automatic stop, as disclosed in Patent Document 1.

SUMMARY

It is therefore an object of the present invention to provide a control device for an internal combustion engine which can reliably prevent deterioration in a battery.

In order to achieve the above object, according to an aspect of the embodiments of the present invention, there is provided a control device for an internal combustion engine, including: an electricity generator configured to be driven by the internal combustion engine; a battery configured to store electricity generated by the electricity generator; a discharge amount detection section configured to detect a discharge amount of the battery; an automatic stop control section configured to automatically stop the internal combustion engine, when the discharge amount is equal to or less than a first setting value; a continuous discharge amount detection section configured to detect a continuous discharge amount of the battery based on the discharge amount; and an automatic stop prohibition section configured to prohibit an automatic stop when the continuous discharge amount is equal to or more than a second setting value, which is lower than the first setting value.

With this configuration, the continuous discharge amount of the battery is detected, and the automatic stop of the internal combustion engine is prohibited when the detected continuous discharge amount is equal to or more than the second setting value which is lower than the first setting value of the discharge amount for automatically stopping the internal combustion engine. Accordingly, it is possible to reliably prevent the deterioration in the battery due to the continuous discharge.

Further, since the automatic stop of the internal combustion engine is prohibited when the continuous discharge amount is equal to or more than the second setting value which is lower than the first setting value of the discharge amount, it is possible to prohibit the automatic stop of the internal combustion engine at the earlier stage as compared with the related art, in the case where the battery is continuously discharged. Even though the deterioration in the battery starts at the earlier stage due to the continuous discharge, it is possible to reliably prevent the deterioration.

DETAILED DESCRIPTION OF THE EMBODIMENTS

Hereinafter, an embodiment of the present invention will now be described with reference to the accompanying drawings.

Figure 1:
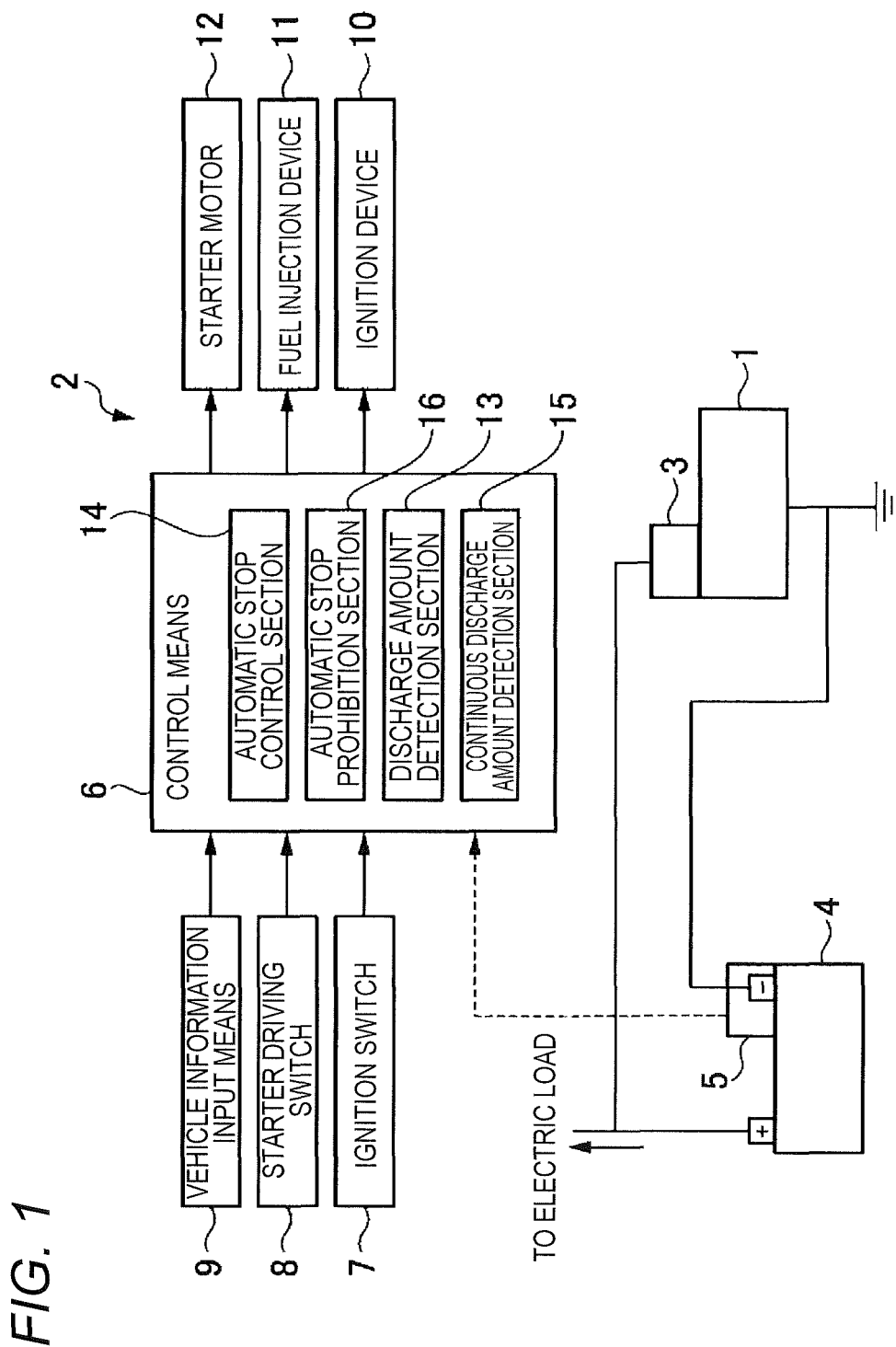
FIG. 1 is a system diagram illustrating a control device for an internal combustion engine according to an embodiment of the present invention.

FIGS. 1 to 4 show an embodiment of the present invention. In FIG. 1, a control device 2 for an internal combustion engine 1 includes an electricity generator 3 driven by the internal combustion engine 1, a battery 4 storing electricity generated by the electricity generator 3 to supply it to an electric load, and a current sensor 5 for detecting a current of the battery 4. The current sensor 5 is connected with an input side of a control means 6. The input side of the control means 6 is connected with an ignition switch 7, a starter driving switch 8, and a vehicle information input means 9. Further, an output side of the control means 6 is connected with an ignition device 10, a fuel injection device 11, and a starter motor 12.

The control means 6 has a discharge amount detection section 13 and an automatic stop control section 14. The discharge amount detection section 13 detects a discharge amount Q1 based on an output value of the current sensor 5. The automatic stop control section 14 automatically stops the internal combustion engine 1, and automatically starts the internal combustion engine 1 automatically stopped, based on the discharge amount Q1 inputted from the discharge amount detection section 13, an ON/OFF signal inputted from the ignition switch 7, a starter driving signal inputted from the starter driving switch 8, and vehicle speed information, throttle opening degree information, accelerator pedal depressing information, a brake pedal depressing information, or the like inputted from a vehicle information input means 9.

Figure 2:
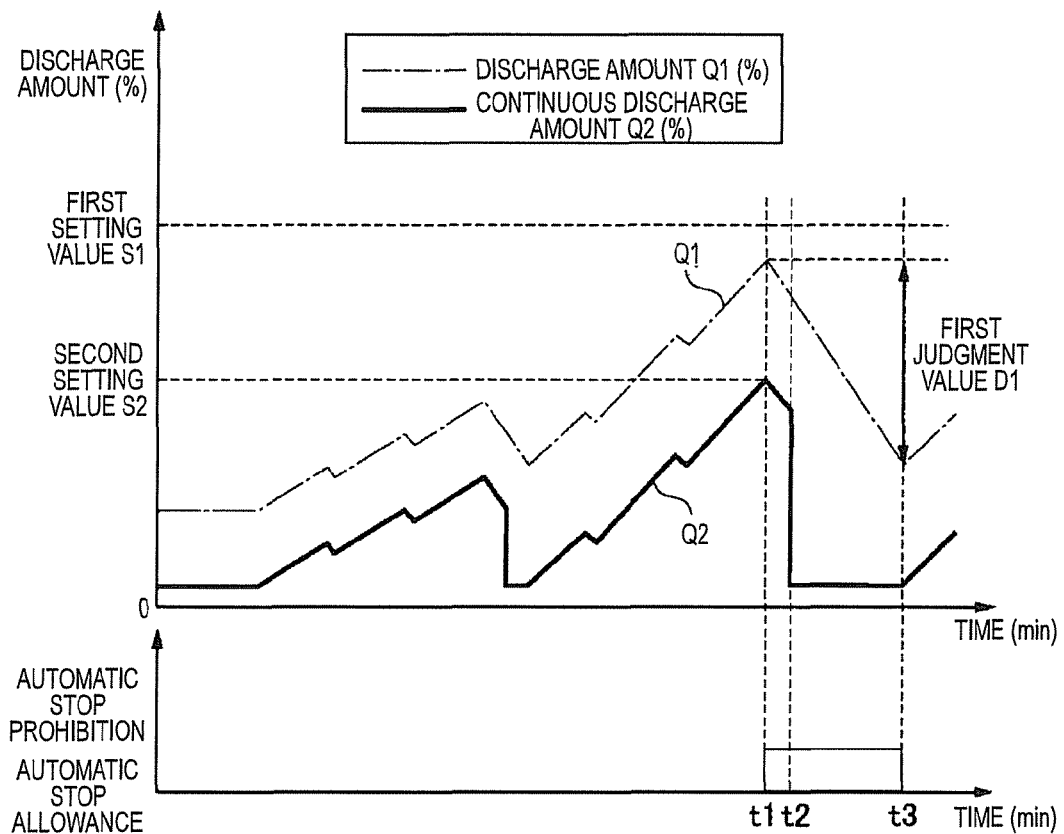
FIG. 2 is a time chart of an automatic stop prohibition according to the embodiment.

The automatic stop control section 14 automatically stops the internal combustion engine 1 by stopping operation of the ignition device 10 and the fuel injection device 11, when an automatic stop condition is satisfied, for example, the discharge amount Q1 is equal to or less than a first setting value S1 (see FIG. 2). Further, the automatic stop control section 14 automatically starts the internal combustion engine 1 by operating the ignition device 10, the fuel injection device 11, and the starter motor 12, when an automatic start condition is satisfied, for example, an accelerator pedal is depressed while the internal combustion engine 1 is automatically stopped.

The control device 2 for the internal combustion engine 1 includes a continuous discharge amount detection section 15 and an automatic stop prohibition section 16. The continuous discharge amount detection section 15 detects a continuous discharge amount Q2 of the battery 4, based on the discharge amount Q1 detected by the discharge amount detection section 13. The automatic stop prohibition section 16 prohibits the automatic stop of the internal combustion engine 1 by the automatic stop control section 14, when the continuous discharge amount Q2 detected by the continuous discharge amount detection section 15 is equal to or more than a second setting value S2, as illustrated in FIG. 2. The second setting value S2 of the continuous discharge amount Q2 is a value lower than the first setting value S1 of the discharge amount Q1.

Figure 3:
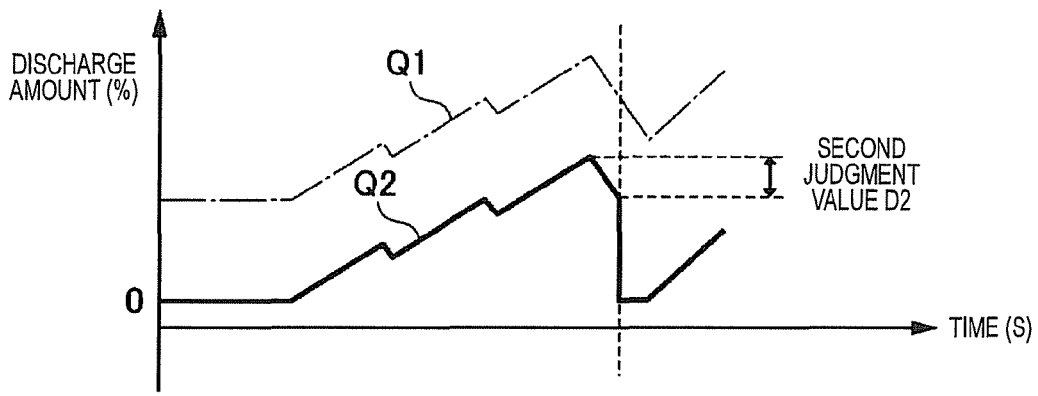
FIG. 3 is a time chart of a continuous discharge amount according to the embodiment.

In the case where the automatic stop of the internal combustion engine 1 is prohibited when the continuous discharge amount Q2 detected by the continuous discharge amount detection section 15 is equal to or more than the second setting value S2, as illustrated in FIG. 2, the automatic stop prohibition section 16 continues to prohibit the automatic stop until the discharge amount detection section 13 detects the charge which is equal to or more than a first judgment value D1. Further, when the continuous discharge amount detection section 15 detects the charge which is equal to or more than a second judgment value D2, as illustrated in FIG. 3, the continuous discharge amount Q2 is returned to an initial value (0).

Next, the operation of the control device 2 for the internal combustion engine 1 will be described with reference to the flowchart of FIG. 4.

In this embodiment, the case has been described as one example in which the control is executed in the state in which the discharge amount Q1 detected by the discharge amount detection section 13 is equal to or less than the first setting value S1, and the internal combustion engine 1 allowed for the automatic stop is driven, but the control is executed even in the case where the discharge amount Q1 is equal to or more than the first setting value S1, and the automatic stop is prohibited.

Figure 4:
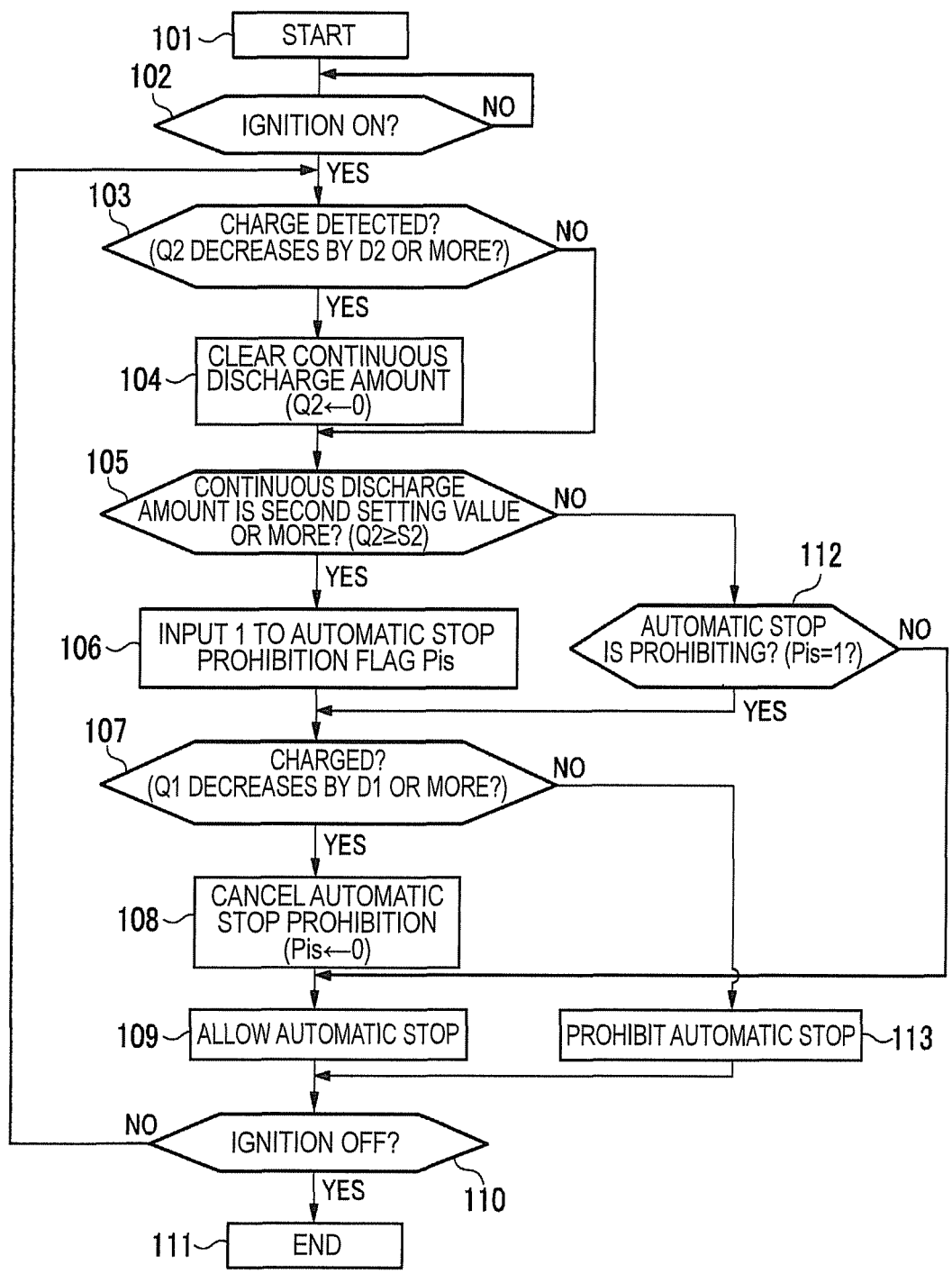
FIG. 4 is a flowchart of the control device for the internal combustion engine according to the embodiment.

If the ON signal is received from the ignition switch 7, the control device 2 for the internal combustion engine 1 starts a control program (101), as illustrated in FIG. 4. If the ignition switch 7 is on (102: YES), the control device calculates the discharge amount as follows.

In the state in which the discharge amount Q1 detected by the discharge amount detection section 13 is equal to or less than the first setting value S1, and the internal combustion engine 1 allowed for the automatic stop is driven, the control device 2 for the internal combustion engine 1 determines whether the continuous discharge amount detection section 15 detects the charge which is equal to or more than the second judgment value D2 (whether the continuous discharge amount detection section 15 detects the decrease in the continuous discharge amount Q2 which is equal to or more than the second judgment value D2) (103).

If it is YES in the determination (103), it is determined that the continuous discharge is stopped, and the continuous discharge amount Q2 is returned to the initial value S2 (104). It is determined whether the continuous discharge amount Q2 detected by the continuous discharge amount detection section 15 is equal to or more than the second setting value S2 (105). Further, if it is NO in the determination (103), it proceeds to the determination (105) that the continuous discharge amount Q2 detected by the continuous discharge amount detection section 15 is equal to or more than the second setting value S2.

If it is YES in the determination (105), one (1) is inputted to an automatic stop flag Pis (106), and it is determined whether the discharge amount detection section 13 detects the charge which is equal to or more than the first judgment value D1 (whether the discharge amount detection section 13 detects the decrease in the discharge amount Q1 by the first judgment value D1 or more) (107).

If it is YES in the determination (107), zero (0) is inputted to the automatic stop flag Pis to cancel the prohibition of the automatic stop of the internal combustion engine 1 by the automatic stop prohibition section 16 (108) and to allow the internal combustion engine 1 to automatically stop by the automatic stop control section 14 (109), and it is determined whether the ignition switch 7 is off (110).

If it is YES in the determination (110), the program is ended (111). If it is NO in the determination (110), it returns to the determination (103).

If it is NO in the determination (105), it is determined whether the automatic stop flag Pis is 1, and the automatic stop of the internal combustion engine 1 is prohibited by the automatic stop prohibition section 16 (112).

If it is YES in the determination (112), it proceeds to the determination (107) of whether the discharge amount detection section 13 detects the charge which is equal to or more than the first judgment value D1. If it is NO in the determination (112), it proceeds to the allowance (109) for the automatic stop of the internal combustion engine 1 by the automatic stop control section 14.

If it is NO in the determination (107), the automatic stop prohibition section 16 prohibits the automatic stop of the internal combustion engine 1 (113), and it proceeds to the determination (110) of whether the ignition switch 7 is off.

If it is YES in the determination (110), the program is ended (111). If it is NO in the determination (110), it returns to the determination (103).

If the continuous discharge amount Q2 detected by the continuous discharge amount detection section 15 is equal to or more than the second setting value S2 (t1), as illustrated in FIG. 2, the control device 2 for the internal combustion engine 1 prohibits the automatic stop of the internal combustion engine 1 by the automatic stop prohibition section 16. Due to the prohibition of the automatic stop, the internal combustion engine 1 continuously operating drives the electricity generator 3 to charge the battery 4.

Due to the charge of the battery 4, if the continuous discharge amount Q2 detected by the continuous discharge amount detection section 15 is decreased by the second judgment value D2 or more (FIG. 3), and the battery is charged by the continuous discharge amount Q2 higher than the second judgment value D2 (t2), the continuous discharge amount Q2 is returned to the initial value (0).

Subsequently, due to the charge of the battery 4, if the discharge amount Q1 detected by the discharge amount detection section 13 is decreased by the first judgment value D1 or more, and the battery is charged by the discharge amount Q1 higher than the first judgment value D1, the prohibition of the automatic stop is cancelled (t3).

In this way, the control device 2 for the internal combustion engine 1 can detect the continuous discharge amount Q2 of the battery 4 by the continuous discharge amount detection section 15, and prohibit the automatic stop of the internal combustion engine 1, when the detected continuous discharge amount Q2 is equal to or more than the second setting value S2 which is lower than the first setting value S1 of the discharge amount Q1 which automatically stops the internal combustion engine 1. Therefore, it is possible to reliably prevent the deterioration in the battery 4 due to the continuous discharge, by continuously driving the internal combustion engine 1 to charge the battery 4.

Further, the control device 2 for the internal combustion engine 1 prohibits the automatic stop of the internal combustion engine 1, when the continuous discharge amount Q2 is equal to or more than the second setting value S2 which is lower than the first setting value S1 of the discharge amount Q1. Therefore, as compared with the related art, it is possible to prohibit the automatic stop of the internal combustion engine 1 at the earlier stage, in the case where the battery 4 is continuously discharged. Even though the deterioration in the battery 4 starts at the earlier stage due to the continuous discharge, it is possible to reliably prevent the deterioration.

In addition, in the case where the automatic stop of the internal combustion engine 1 is prohibited, the automatic stop prohibition section 16 continues to prohibit the automatic stop until the discharge amount detection section 13 detects the charge which is equal to or more than the first judgment value D1. Therefore, since the prohibition of the automatic stop is continuously maintained until the sufficient charge is performed, the deterioration in the battery 4 does not start even though the automatic stop restarts.

Furthermore, when the automatic stop control section 14 detects the charge which is equal to or more than the second judgment value D2, the automatic stop prohibition section 16 determines that the continuous discharge of the battery 4 is stopped, by returning the continuous discharge amount Q2 to the initial value (0). Therefore, it is possible to prevent the automatic stop from being frequently prohibited.

In the above-described embodiment, the prohibition of the automatic stop is determined by the continuous discharge amount Q2 of the battery 4. However, since current receiving properties of the battery 4 are changed under the influence of temperatures, a temperature of the battery, a temperature of air, a temperature of a coolant in the internal combustion engine, and an internal temperature of the battery are measured, and a value (first setting value S1, second setting value S2, first judgment value D1, and second judgment value D2) to determine the charge/discharge may be changed depending upon each temperature.

If a case where a value to determine the charge/discharge of the battery 4 is lowered by the temperature, it is possible to prevent the deterioration in the battery by dutifully prohibiting the automatic stop. In the case where the judgment value is increased by the temperature, the frequency of the automatic stop rises, which leads to the improvement in the fuel efficiency.

The present invention is to reliably prevent the deterioration in the battery, and is not limited to a vehicle equipped with only the internal combustion engine as the drive source, but is applied to the prohibition of the automatic stop of a vehicle equipped with the internal combustion engine and a motor as the drive source.

What is claimed is:

1. A control device for an internal combustion engine, comprising:
   an electricity generator configured to be driven by the internal combustion engine;
   a battery configured to store electricity generated by the electricity generator;
   a discharge amount detection section configured to detect a discharge amount of the battery;
   an automatic stop control section configured to automatically stop the internal combustion engine when the discharge amount is equal to or less than a first setting value;
   a continuous discharge amount detection section configured to detect a continuous discharge amount of the battery based on the discharge amount; and
   an automatic stop prohibition section configured to prohibit an automatic stop when the continuous discharge amount is equal to or more than a second setting value, which is lower than the first setting value,
   wherein when a charge which is equal to or more than a second judgment value is detected, the continuous discharge amount is returned to an initial value of zero by the continuous discharge amount detection section.

2. The control device for the internal combustion engine according to claim 1, wherein if the automatic stop is prohibited when the continuous discharge amount is equal to or more than the second setting value, the automatic stop prohibition section continues to prohibit the automatic stop until the discharge amount detection section detects a charge which is equal to or more than a first judgment value.

* * * * *